Sept. 8, 1931.  V. KAPLAN  1,822,778
HYDRAULIC TURBINE
Filed July 30, 1914   2 Sheets-Sheet 1
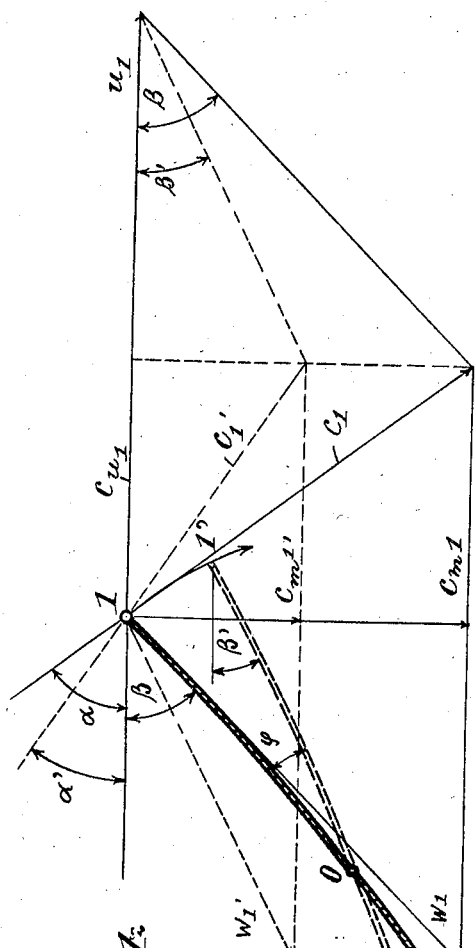
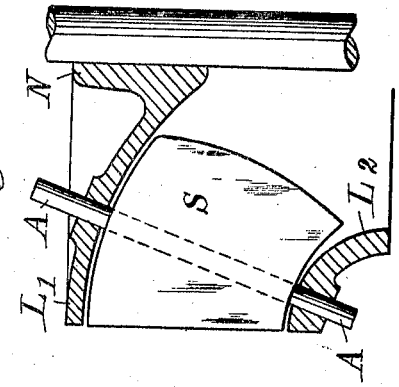
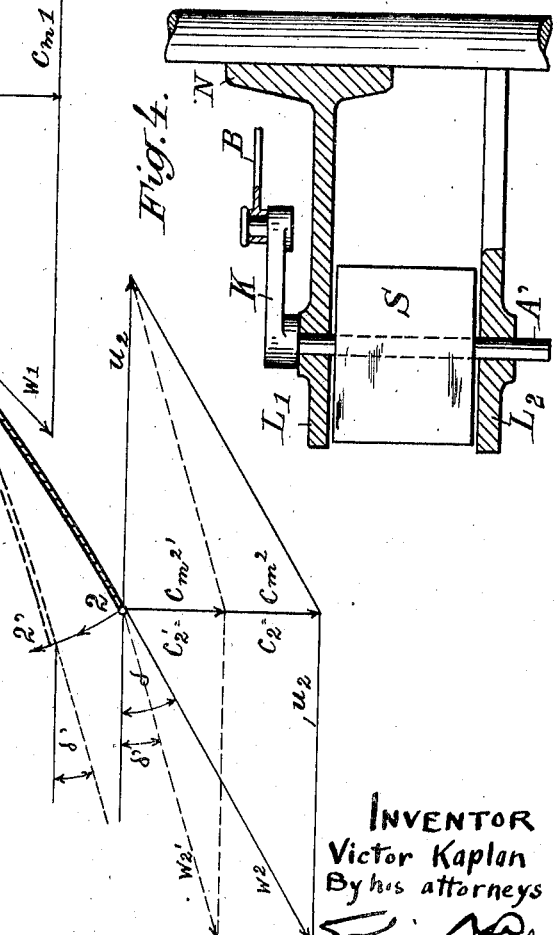
WITNESSES
INVENTOR
Victor Kaplan
By his attorneys Sept. 8, 1931.  V. KAPLAN  1,822,778
HYDRAULIC TURBINE
Filed July 30, 1914   2 Sheets-Sheet 2

WITNESSES

INVENTOR
Victor Kaplan
By his attorneys

Patented Sept. 8, 1931

1,822,778

UNITED STATES PATENT OFFICE

VICTOR KAPLAN, OF BRUNN, AUSTRIA

HYDRAULIC TURBINE

Application filed July 30, 1914, Serial No. 854,149, and in Hungary February 18, 1913.

The present invention relates to improvements in turbines, and more particularly relates to improvements in high specific speed hydraulic turbines.

One object of the present invention is to effect a regulation or adjustment of the runners of hydraulic turbines in accordance with the variation of the quantity of fluid passed, whereby a sustained efficiency is maintained over wide ranges of load due to the avoidance of axial eddies.

Other objects will be apparent from the consideration of the specification and claims.

In the regulating devices at present in use, the variation of the quantity of fluid medium passing through a turbine is obtained either by throttling the passage of the medium by means of throttling flaps, slides, valves, cocks or the like, or by employing turnable guide vanes, so called Fink turn vanes which enable the clear width of passage between two neighboring guiding vanes to be altered from a certain maximum down to zero. Although the latter mode of regulation is superior to the former, the regulation by means of turnable guide vanes has, especially in connection with rapidly revolving runners, the disadvantage that the efficiency is rapidly decreased when the quantity of fluid passed is reduced.

In order to obviate this disadvantage the runner of the turbine is, according to the present invention, provided with blades which are adapted to be turned about axes in such a manner that the relative position of the guide vanes and runner blades, and consequently the inlet and outlet angles of the runner blades may be altered in accordance with the variation of the quantity of fluid passed through the guide vanes. By the simultaneous alteration of these two angles and the consequent alteration of the inlet and outlet sections or passages, the inlet and outlet angles of the runner may be adapted to any desired admission and at the same time the formation of axial eddies is prevented, whereby a very high efficiency may be obtained over wide ranges of load.

Figure 2:
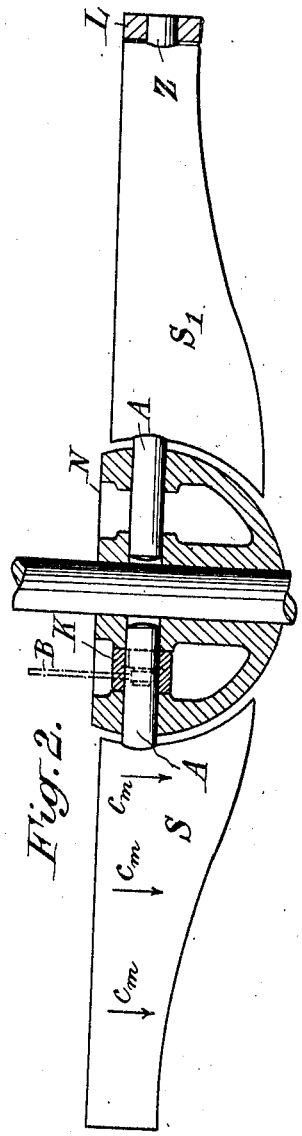
Figure 3:
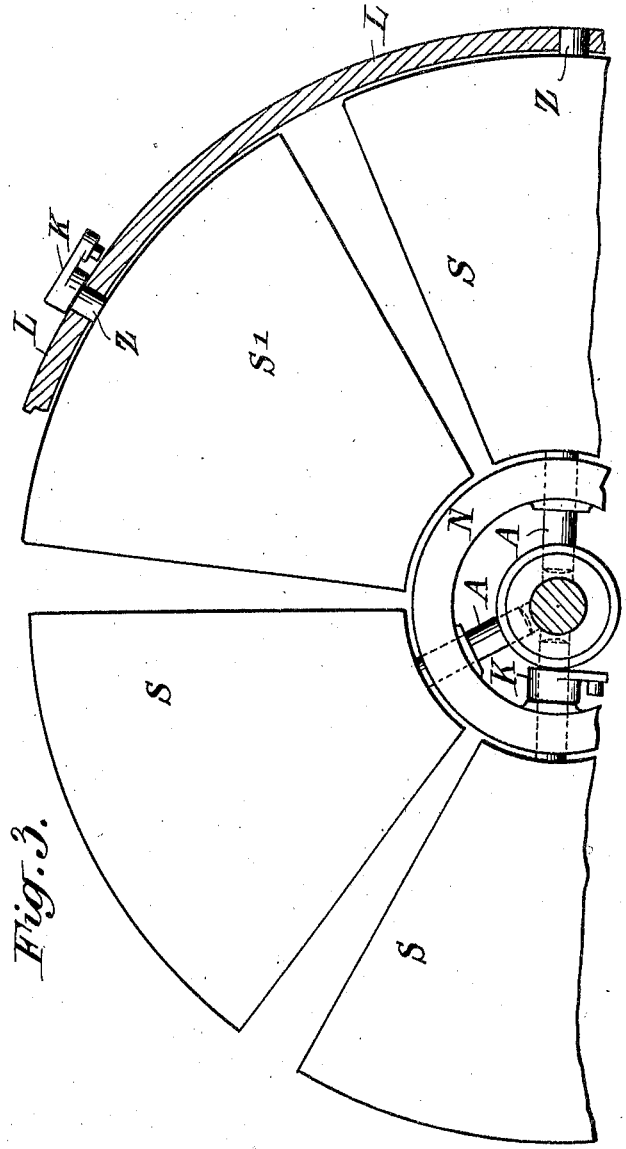

The invention is illustrated in the accompanying drawings in which Figure 1 is a diagrammatic view showing the variation of the velocities and angles with varying admission, Figure 2 an elevation of a runner of a water turbine, the hub of the wheel being shown in section, and Figure 3 a fragmentary plan corresponding to Figure 2. Figures 4 and 5 illustrate the application of the invention to radial-flow and Francis-turbines respectively.

In order to clearly explain the invention the velocities of the water during the passage through a runner have been diagrammatically shown in Figure 1, the influence of the resistance not having been taken into account. The blade of the runner is designated by 1, 0, 2, whilst the absolute inlet velocity of the water at the point of inlet 1 is designated by $c^1$. $u^1$ is the peripheral velocity and $w^1$ the relative velocity of the water at the same point; $c^2$, $u^2$ and $w^2$ represent the same velocities at the outlet 2. The angle of discharge of the guide vanes is indicated by $\alpha$, the angle of discharge or the outlet angle of the runner blade as indicated by $\delta$ and the inlet angle of the runner blade is indicated by $\beta$.

During normal working, that is, with normal admission, the parallelograms of velocities are respectively represented by the magnitudes $u^1$ $w^1$; and by the magnitudes $u^2$, $w^2$; both parallelograms being shown by full line in Figure 1. To these parallelograms of velocities correspond certain angles $\alpha$, $\beta$ and $\delta$. If now the admission, that is, the quantity of fluid passed through the runner be altered, whilst the fluid remains at the same head and the runner runs at the same number of revolutions, the meridian velocities indicated in Figure 1 by $cm^1$, $cm^2$ and in Figure 2 by $cm$ are altered. If, therefore, a satisfactory efficiency is to be obtained at a partial admission, provision must be made in order to actually obtain the new velocities $cm^{1'}$, $u^{1'}$, $cm^{2'}$ and $w^{2'}$, or in other words provision must be made in order to obtain the two new parallelograms of velocities formed respectively by $u^1$ and $w^{1'}$ and by $u^2$ and $w^{2'}$. These new parallelograms are indicated in dotted lines in Figure 2, and it will be seen from that figure that the angles α, β, and δ are required to be altered to α', β', and δ'.

For this purpose the blades of the runner are adapted to be turned about axes in such a manner that the required alteration of the angles β to β' and δ to δ' may be obtained with an accuracy sufficient for practical purposes. In Figure 1 the pivot about which the blade is turned is indicated by 0, the adjusted blade being indicated by 1', 0, 2'. It will be seen that the angles β' and δ' of the adjustable blade have approximately the required magnitudes. The position of the pivot is determined by the required alteration of the angles and by the requirement of a sufficient strength of the runner. The pivot may, therefore, be either inside or outside the surface of the blade.

In the construction of the runner of a water turbine with axial water flow shown in Figures 2 and 3, several manners of mounting the runner in the rotor wheel are shown by way of example.

The blades S shown on the left hand side of these figures are provided at their inner faces with a pivot A which is rotatably mounted in the hub N of the runner. The hub N is preferably of spherical shape in order to obtain a satisfactory fit between the blade and the hub in each position of the blade S.

The adjustment of the blades may be effected by any suitable means, such as for instance, levers, gear wheels or the like. In the construction shown in Figures 2 and 3, the pivot A mounted in the hub N is provided with a lever K which may be actuated by a pull rod B. By operating the pull rod B the lever K together with the pivot A and the blade S are turned. The blade may also, if the rotor wheel is provided with an outer rim L, shown on the right hand side of Figures 2 and 3, be mounted in the said rim L. For this purpose the runner $S^1$ may be provided at its outer face with a pivot Z which is mounted in the rim L, and is adapted to be turned by means of a lever K or the like, together with the runner $S^1$. Moreover, as shown on the right side of Figures 2 and 3, the blade $S^2$ may be provided as well with an inner pivot A and an outer pivot Z so that the blade $S^2$ is mounted not only in the hub N but also in the outer rim L, that is at both ends. The blade $S^2$ may also in this construction be turned by means of a lever arm which may be fixed either to the outer pivot Z or to the inner pivot A.

The arrangement for adjusting the blades described in connection with axial flow turbines may also be used, as shown in Figures 4 and 5, for radial flow or Francis turbines and for combination axial flow and Francis turbines. The axis of rotation A of the runner S is mounted as shown in these figures in the upper rim $L^1$ as well as in the lower rim $L^2$, but it may be mounted only in one of these two rims. The adjustment of the blades S may be effected by the means mentioned in connection with axial turbines. In Figure 4 the pivot $A^1$ is provided at the upper rim with a lever K adapted to be actuated by means of a pull rod B.

The regulation of the blades of the runner may be effected automatically either by using for instance, the alteration of the condition of flow of the medium, or the alteration of the number of rotations, or the alteration of the turning moment all of which are produced by the alteration of the admission, or by combining the regulation of the runner blades with the regulation of the guide vanes for instance, in such a manner that by means of a common guide the adjustment of the guide vanes is effected, and by the latter an adjustment of the runner blades is effected. Finally the regulation of the blades of the runner may also be directly obtained manually.

I claim:

1. A runner wheel for high speed water turbines provided with guide vanes, said wheel comprising a plurality of angularly adjustable blades, and means to adjust said blades while the wheel is running so as to vary not only the outlet angles and passages but also the inlet angles and passages of the wheel, to correspond to variations in the supply of water and in the power required.

2. A high-speed hydraulic turbine comprising movable guide vanes adapted to vary the admission of water to said turbine, a runner comprising a plurality of angularly adjustable blades, and means to adjust said blades while the wheel is running so as to vary not only the outlet angles and passages but also the inlet angles and passages of the said runner to correspond to variations in the supply of water passed through said guide vanes.

3. A high-speed hydraulic turbine comprising movable guide vanes adapted to vary the admission of water to said turbine, a runner comprising a plurality of angularly adjustable blades and adjusting means for said runner blades so that the outlet angles and passages as well as the inlet angles and passages of said runner may be varied to correspond with variations in the water supply passed through said movable guide vanes.

In testimony whereof I have signed my name to this specification.

Dr. Eng. VICTOR KAPLAN.